Robinson & Clark,
Steam-Engine Piston.
Nº 29,621.                    Patented Aug. 14, 1860.

Witnesses.                    Inventors.

UNITED STATES PATENT OFFICE.

JOHN K. ROBINSON AND JOHN M. CLARK, OF BELLAIRE, OHIO.

PISTON FOR STEAM-ENGINES.

Specification of Letters Patent No. 29,621, dated August 14, 1860.

*To all whom it may concern:*

Be it known that we, JOHN K. ROBINSON and JOHN M. CLARK, both of Bellaire, in the county of Belmont and State of Ohio, have invented certain new and useful Improvements in Pistons for Steam-Engines, of which the following is a full, clear, and exact description, reference being had to the accompanying drawings, which make part of this specification, and in which—

Figure 1:
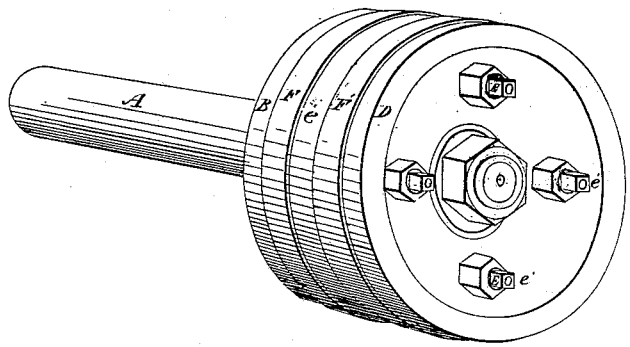
Figure 4:
Figure 5:
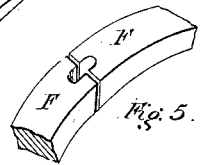
Figure 2:
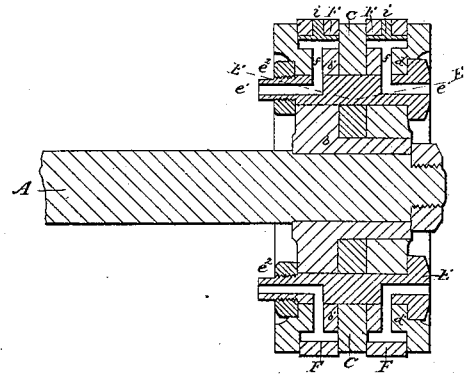
Figure 3:
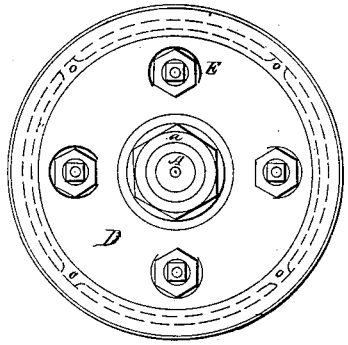

Figure 1 represents a view in perspective of our improved piston. Fig. 2 represents a longitudinal axial section through the same. Fig. 3 represents a view of the front of the same. Fig. 4 represents a view in perspective of our improved guard and tongue-piece for preventing the escape of steam through the openings in the rings; and Fig. 5 represents a similar view of a fragment of a packing-ring, showing the recesses into which the tongue piece fits.

In the infancy of the steam engine the piston was rendered steam-tight by means of packing composed of some fibrous material saturated with an oleaginous substance; but this mode of packing the piston has, of late years, been almost entirely superseded by the use of metallic packing. This metallic packing usually consists of a series of rings or segments of rings secured around a central core or spindle, which rings are liable to wear unequally on different parts of their surface, and thus to cause a leakage and waste of steam and a consequent diminution of the power of the engine. Numerous devices (such as springs, screws, cams, wedges, &c.) some of which are very complex and expensive, have been resorted to for the purpose of obviating this evil; but, so far as our knowledge extends, no device has yet been applied which accomplishes this result in an entirely satisfactory manner, for they all create difficulties almost if not quite as troublesome as those they profess to overcome. After much thought and experiment with a view to obviate the objections to which this class of pistons are subject we at length conceived the idea of doing away with all such appliances, and of causing the pressure of the steam itself to keep the rings in contact with the cylinder, and to this end our invention consists—

First. In forming the piston of a series of disks or plates of different diameters, arranged alternately upon the piston-rod so as to form grooves for the insertion of the metallic packing-rings (which rings are of the usual form) and uniting said plates by means of bolts so as to form a solid piston when screwed up. By this arrangement the plates or rings can readily be removed from the cylinder to be repaired or cleaned without the necessity of removing the entire piston; and the rings can be put on or taken off without straining them by opening them sufficiently to pass over a solid piston.

Secondly. In perforating the bolts which unite the plates or disks in such manner that while they hold the different parts of the piston together, they at the same time form passages through which the steam may pass from the cylinder to the packing-rings, whereby, the rings are positively expanded by the direct action of the steam.

Thirdly. In adjusting the pressure upon the packing-rings by regulating the quantity of steam admitted to the interior of the piston, whereby the engine can readily be adapted to the varying requirements to which it is subjected.

Fourthly. In introducing a tongue-piece between the ends of the joints of the packing-rings, which tongue-piece is so constructed that (in combination with its guard) it effectually prevents the steam from escaping therefrom around the packing in any direction.

The accompanying drawings represent a piston embracing our improvements. It consists in this instance of three disks or plates (B, C, D) which are secured upon a piston-rod (A) and held together by bolts (E) passing through them. The rear piston-head (B) is provided with a flange or collar (b) fitting snugly on the front end of the piston-rod (which is turned smaller for that purpose) and is secured in place by a nut (a) on the end of the rod. The division-plate (C) and front piston-head (D) are perforated, so as to slip over the collar (b) of the rear piston-head (B) and all three are securely united by means of bolts (E) passing through them. The inner edges of the piston-heads (B, D) are turned down to a smaller diameter than their outer parts, so as to form (in conjunction with the division-plate) grooves into which the packing-rings (F) are inserted. These rings may either be in segments or divided in one place only; we, however, prefer the latter form of construction as it entails less liability to leakage, and the action of the ring is more perfect when its continuity is broken in one place only, than when it is in several pieces. The ends of the packing-rings are grooved (as shown in Fig. 5, of the drawings) for the insertion of a piece of metal ($i$) which we call a "tongue-piece." This tongue-piece ($i$) is secured to the center of a guard-plate (I) (as shown in Fig. 4) and at right angles thereto, which guard-plate is of the same width as the packing ring. Its ends likewise project each side of the tongue-piece the desired distance to give sufficient surface to prevent any escape of steam from between the ring and the guard, which latter must also be curved in the same arc as that of the internal surface of the ring. Hence it will be manifest that no steam can possibly escape at this open part of the ring, while the ring is permitted to be expanded by the pressure of the steam into perfect contact with the internal surface of the cylinder.

The bolts (E) are perforated with channels ($e, e'$) at each end. These channels do not extend entirely through the bolts lengthwise, but bend at right angles so as to make openings through the sides of the bolts. The openings correspond with holes ($f$) drilled through the reduced portions ($b', d'$) of the piston-heads so as to permit the steam to pass freely through to the under side of the packing-rings. The nuts ($e^2$) which hold the bolts in place may be arranged either as shown in the drawings or be tapped into the piston-head to prevent them from dropping off inside the cylinder and the bolts be allowed to turn instead of the nuts.

The operation of the machine is as follows. In putting the piston together the rear head or disk (B) is first secured upon the piston rod by means of its nut, and then drawn within the cylinder. One of the packing-rings (F) is then slipped upon the reduced part ($b'$) of the head B, and the division-plate (C) placed upon the collar ($b$). The other ring (F') is then placed upon the reduced part ($d'$) of the front piston-head (D), and this head is likewise placed upon the collar ($b$.) The parts are then firmly screwed together by means of the bolts (E) and nuts ($e^2$), care being taken that the channels ($e, e'$) correspond with the openings ($f$) in the head-plates. The cylinder-head may then be put on and the steam admitted to the cylinder. As the pressure of the steam is exerted upon the piston head the steam rushes through the channels in the bolts and the holes in the piston-head, and acts upon the under side of one of the packing-rings causing it to expand and to conform to the inner surface of the cylinder. When steam is admitted to the other side of the piston to reverse the stroke, the same operation is repeated and the ring on that side of the piston-head is expanded; the division-plate (C) preventing any escape of steam through the piston from one side to the other. The guard (I) and tongue-piece ($i$) likewise prevent any escape of steam through the rings. The quantity of steam admitted to the rings and the consequent pressure which they exert upon the cylinder may be adjusted at will by turning the bolts (E) on their axes so as to cause their openings to correspond more or less closely with those in the piston-heads and thus to increase or diminish the area of the steam-passages. Any wear upon the outer surface of the rings would of course be compensated by their expansion, while, if from any cause either the sides of the rings or those of the plates should become unequally worn—such inequality may readily be corrected by grinding the two surfaces together with emery.

The steam passages might pass directly through the piston-heads; but in that case the steam-pressure upon the rings could not be so easily controlled.

The rings being loose upon the piston may be liable to work about, but this may be remedied to a great extent by means of projections ($o$) upon the reduced parts of the piston-heads; which projections will serve to keep the rings in place, and yet permit the steam to circulate freely beneath them, as shown by the dotted lines in Fig. 3.

It is obvious that the details of our arrangements may be modified in various ways without departing from the spirit of our invention; but as such variations would suggest themselves to any intelligent machinist after seeing our specification and drawings, we deem a detailed description of such modifications unnecessary in this place.

What we claim as our invention, and desire to secure by Letters Patent, is—

1. A piston composed of a series of solid disks or plates of varying diameter, united by bolts, substantially as herein described, for the purpose set forth.

2. Perforating the bolts which hold the piston-plates together substantially as, and for the purpose described.

3. Adjusting the pressure of the steam upon the packing-rings by turning the screw-bolts, substantially as described.

4. The combination of the guard-plate (I) and tongue-piece ($i$) with the ring, when arranged substantially in the manner described.

In testimony whereof we have hereunto subscribed our names.

JOHN K. ROBINSON.
JOHN M. CLARK.

Witnesses:
E. G. MORGAN,
WM. J. KELLY.